(12) United States Patent
Itou

(10) Patent No.: US 7,397,057 B2
(45) Date of Patent: Jul. 8, 2008

(54) OPTICAL INFORMATION READOUT APPARATUS

(75) Inventor: Kunihiko Itou, Chiryu (JP)

(73) Assignee: Denso Wave Incorporated, Tokyo (JP)

( * ) Notice: Subject to any disclaimer, the term of this patent is extended or adjusted under 35 U.S.C. 154(b) by 159 days.

(21) Appl. No.: 11/342,814

(22) Filed: Jan. 31, 2006

(65) Prior Publication Data

US 2006/0175411 A1 Aug. 10, 2006

(30) Foreign Application Priority Data

Feb. 9, 2005 (JP) ............... 2005-033210

(51) Int. Cl.
*H01J 3/14* (2006.01)
*G06K 7/10* (2006.01)
(52) U.S. Cl. .............. 250/566; 250/234; 235/462.23; 235/462.24
(58) Field of Classification Search ........ 250/234, 250/235, 566, 568, 557; 235/462.22–462.24, 235/462.35, 454
See application file for complete search history.

(56) References Cited

U.S. PATENT DOCUMENTS 5,311,176 A * 5/1994 Gurney ............... 341/50

6,066,857 A 5/2000 Fantone et al.

FOREIGN PATENT DOCUMENTS

| JP | A-06-301810 | 10/1994 |
| JP | A-09-034977 | 2/1997 |
| JP | 2003-507778 | 2/2003 |

OTHER PUBLICATIONS

Notice of Preliminary Rejection from Korean Patent Office issued on Jan. 17, 2007 for the corresponding Korean patent application No. 10-2006-0012246 (a copy and English translation thereof).

* cited by examiner

*Primary Examiner*—Kevin Pyo
(74) *Attorney, Agent, or Firm*—Posz Law Group, PLC

(57) ABSTRACT

An optical information readout apparatus is disclosed having an image forming optical section 4 operative to shift first and second lenses 24, 25 along an optical axis "O" at areas in front of a photodetector 3. A cylindrical body 23 incorporates a lens holder means, including permanent magnets 26 to 28, by which the first lens 24 is halted and held in any of positions a1, a2 and the second lens 24 is halted and held in any of positions b1, b2. Coils 31, 32, 75, 76 and a control circuit 16 drivingly shift the lenses. The control circuit is operative to independently move the lenses to change a focusing range of the image forming optical section in four different stages in the occurrence of a failure in reading out a two-dimensional code.

15 Claims, 10 Drawing Sheets

FIG. 2

| PATTERNS | FIRST LENS | | SECOND LENS | | PATTERNS TO BE SELECTED IN FAILURE OF READOUT | PATTERNS TO BE SELECTED IN FURTHER FAILURE OF READOUT | PATTERNS TO BE SELECTED IN STILL FURTHER FAILURE OF READOUT |
|---|---|---|---|---|---|---|---|
| | a1 | a2 | b1 | b2 | | | |
| (1) | | ○ | | ○ | (2) | (3) | (4) |
| (2) | | ○ | ○ | | (3) | (4) | (1) |
| (3) | ○ | | | ○ | (2) | (1) | (4) |
| (4) | ○ | | ○ | | (3) | (2) | (1) |

(FOR PATTERN (1))

(FOR PATTERN (2))

(FOR PATTERN (3))

(FOR PATTERN (4))

OPTICAL INFORMATION READOUT APPARATUS

CROSS REFERENCE TO RELATED APPLICATIONS

This application is related to Japanese Patent Application No. 2005-033210 filed on Feb. 9, 2005, the content of which is hereby incorporated by reference.

BACKGROUND OF THE INVENTION

1. Field of the Invention

The present invention relates to optical information readout apparatus and, more particularly, to an optical information readout apparatus, including a readout device having an image forming optical section and a photodetector to be operative to optically readout an information code recorded on a readout object, and a focus shift device for changing a focal position of the image forming optical section.

2. Description of the Related Art

Attempts have heretofore been made in the related art to provide a hand-held optical information readout apparatus for reading out optical information such as a bar code and a two-dimensional code. The optical information readout apparatus is comprised of a body case, formed in for instance a hand-held structure, and a readout device including a photodetector, an image forming optical section having focusing lenses, and an illumination unit or the like that are mounted inside the body case. The illumination device is configured to irradiate an illumination light from a readout opening, formed at a distal end of the body case, onto a readout object (such as a product label recorded with for instance a bar code) to cause a reflection light to be incident on the photodetector to image.

Under such circumstances, a readout distance (a distance between the readout opening and the readout object) for optical information is preliminarily fixed depending on an optical characteristic (of mainly a focus distance) of the image forming optical section assembled to the readout device and a user performs readout operation upon locating the readout device (readout opening) over the readout object by a given readout distance (within a range of a certain degree). In contrast to such an operation, another attempt has been made in recent years to provide a readout device with a mechanism adapted to vary a focal position of an imaging optical section, with the resultant consideration in widening a range of a readout enabling distance available for the single readout device for thereby achieving user-friendliness.

To give an actual example, a readout structure has been proposed which includes an objective taking lens and a CCD detector element between which a focusing disk is provided. The focusing disk, having an outer periphery carrying a plurality (twelve pieces) of optical elements (shims), is caused to rotate for selecting one of the optical elements to change focusing lengths as disclosed in U.S. Pat. No. 6,066,857.

However, with the structure of the optical information readout apparatus incorporating the related art focus shift device using the focusing disk, a need arises for preparing a plurality of optical elements different in thickness, resulting in issues with an increase in the number of component parts and an increase in an overall structure. Further, when changing the focal position, the optical elements (shims) need to be sequentially selected, resulting in deterioration in response time of the readout device. In addition, with the optical information readout apparatus of such a type, no need arises for changing the focusing zones to so many focusing stages resulting in overquality, while causing additional issues with requirements for high precision in positioning the focusing disk.

In the meanwhile, attempts have been made to provide a digital camera and a video camera that incorporate therein zoom lenses or variable focusing lenses for changing best focus positions. However, the variable focusing lenses of such kinds take the form of structures that have increased lens apertures to assure a light intensity and linearly shift best focuses. When applying such structures to the optical information readout apparatus, it takes an extended time period for moving the lenses to a targeted focal position and reading out optical information on the readout object, resulting in remarkable drop in readout speed.

SUMMARY OF THE INVENTION

The present invention has been completed with the above issues in mind and has an object to provide an optical information readout apparatus, having a focus shift device adapted to change a focal position of an image forming optical section, which can be formed in a simplified structure with a relatively small size and which is highly responsive.

To achieve the above object, one aspect of the present invention provides an optical information readout apparatus that comprises a readout device including a photodetector and an image forming optical section having first and second lenses disposed in front of the photodetector along a light receiving optical axis and a focus shift device operative to move the first and second lenses in linearly different positions to change a focusing zone for an information code present in a readout object. A controller is operative to control the focus shift device in the occurrence of a failure in reading out the information code from image data, picked up by the photodetector, so as to linearly move the first and second lenses in different positions along the light receiving optical axis to automatically change a focal position of the image forming optical section.

With such a structure, the first and second lenses are disposed in front of the photodetector to be linearly along the light receiving optical axis, resulting in reduction in the number of component parts to provide a compact structure. Further, the focus shift device is operative to drivingly move the first and second lenses in linearly different positions. Thus, different focusing zones can be acquired for an information code present in a readout object through the use of minimum number of lenses. Also, the controller activates the focus shift device in the occurrence of any failure in reading out the information code from image data to automatically move the first and second lenses, resulting in an increase in response of reading out optical information. That is, the focal position can be changed within the shortest period of time with high reliability in operating performance. Due to a simplified structure of the focus shift device, the controller can be configured to achieve simplified control with the resultant increase in response. Also, the focal position can be automatically changed, thereby achieving user-friendliness.

Another aspect of the present invention provides an optical information readout apparatus wherein the focus shift device includes drive means, associated with the first and second lenses, respectively, which are operative to independently move the first and second lenses in the different positions along the light receiving optical axis.

Due to the provision of the first and second drive means associated with the first and second lenses, the first and second lenses can be linearly moved to the different focusing zones with respect to optical information present in the readout object. This makes it possible to form a drive mechanism in a simplified structure, resulting in a compact structure of the readout device. Also, due to the first and second drive units configured to move the first and second lenses independently from each other, the different focusing zones can be provided in a user-friendly fashion.

Another aspect of the present invention provides an optical information readout apparatus wherein the focus shift device includes lens holder means operative to hold the first and second lenses in shifted positions, respectively, under a nonconductive state of the drive means.

Due to the provision of the lens holder means, the first and second lenses can be retained in fixed places under nonconductive states of the first and second drive means resulting in reduction in power consumption while enabling the first and second lenses to be held in a simplified structure.

Another aspect of the present invention provides an optical information readout apparatus wherein the lens holder means includes magnetic bodies associated with the first and second lenses, respectively, and permanent magnets by which the magnetic bodies are attracted to retain the first and second lenses in the shifted positions, respectively.

The use of the magnetic bodies, by which the first and second lenses are carried, and the permanent magnets, by which the magnetic bodies are attracted, results in the provision of the lens holder means formed in a simplified structure while achieving reduction in power consumption.

Another aspect of the present invention provides an optical information readout apparatus wherein the focus shift device includes air brake chambers adapted to be defined when the first and second lenses move closer to at least stop positions, respectively, to compress air in the air brake chambers for thereby generating braking forces during movements of the first and second lenses.

With such a structure, the air brake chambers are formed between the opposing component parts when the first and second lenses comes closer to the respective stop positions, impact forces exerted on the first and second lenses can be alleviated during the positioning thereof, thereby permitting smooth shifts of the first and second lenses in a simplified structure.

Still another aspect of the present invention provides an optical information readout apparatus wherein the focus shift device includes first and second linearly movable lens holder means by which the first and second lenses are fixedly supported, respectively; and the drive means comprises first and second actuating sections connected to the first and second lens holder means, respectively, and including first and second guide shafts, extending parallel to the light receiving optical axis to guide the first and second lens holder means along the optical axis, and first and second drive motors operatively connected to the first and second actuating sections to linearly move the first and second lens holder means, respectively.

With such a structure, the first and second actuating sections can be independently driven by the first and second drive motors, thereby causing the first and second lens holder means and accordingly the first and second lenses to shift to their respectively shifted positions in a simplified and compact structure.

A further aspect of the present invention provides an optical information readout apparatus wherein the first and second actuating sections include first and second lead screws, drivingly rotated by the first and second drive motors, respectively, to move the first and second lens holder frames along the optical axis, and first and second racks in meshing engagement with the first and second lead screws, respectively, to move the first and second lens holder means along the optical axis.

Due to the provision of the first and second actuating sections including the first and second lead screws and the first and second racks in meshing engagement with the first and second lead screws, the actuating sections can be simplified in structure and operated in a reliable manner.

A further aspect of the present invention provides an optical information readout apparatus wherein the controller is operative to operate either one of the first and second drive means during shift in the focal position of the image forming optical section at one time.

With such a structure, structuring the controller to enable the operation of either the first drive means or the second drive means results in less current to suffice for the operations of the first and second drive motors, achieving reduction in electric power consumption.

A further aspect of the present invention provides an optical information readout apparatus that further comprises: an illumination unit including an illumination source and an illumination lens, operative to irradiate an illumination light onto the readout object, which is associated with the first or second lenses for unitary movement therewith.

With such a structure, the illumination lens is associated with the first or second lenses to move in a unitary fashion with the first or second lenses. This allows the shift of the focal position of the image forming optical section and the change of an illuminating area of the illumination unit to be collectively achieved.

A still further aspect of the present invention provides an optical information readout apparatus wherein a field angle of the readout device and an illuminating range are made variable in a similarity fashion due to movement of the first or second lenses and associated movement of the illumination lens.

Such a structure enables an appropriate illuminating area to be obtained for the field angle of the readout device.

A still further aspect of the present invention provides an optical information readout apparatus that further comprises: a marker light irradiating section including a light source and a marker lens, operative to irradiate a marker light onto the readout object to designate a readout position, which is associated with the first or second lenses for unitary movement therewith.

With such a structure, the focal position of the image forming optical section and the illuminating field angle of the marker light can be collectively changed in a simplified structure.

A still further aspect of the present invention provides an optical information readout apparatus wherein a field angle of the readout device and a marker light irradiating field angle of the marker light irradiating section are made variable in a similarity fashion due to movement of the first or second lenses and associated movement of the marker lens.

Such a structure results in a capability of acquiring an appropriate illuminating field angle of the marker light for the field angle of the readout device at all times.

A still further aspect of the present invention provides an optical information readout apparatus wherein the image forming optical section includes first and second lens assemblies carrying the first and second lenses, respectively, and operative to move the first and second lenses in the linearly different positions along the light receiving optical axis.

With such a structure, the image forming optical section can be formed in a compact and simplified structure.

A still further aspect of the present invention provides an optical information readout apparatus wherein the first and second lens assemblies include first and second lens holder frames, each made of magnetic material, for carrying the first and second lenses and permanent magnets, respectively, and first and second electromagnet means associated with the first and second lens holder means, respectively, to move the first and second lenses in the linearly shifted positions.

A combination of the magnetic lens holder means and the electromagnets enables the image forming optical section to be configured in a compact and simplified structure with reduction in length along the optical direction. Also, such a particular structure results in reduction in the number of component parts, thereby realizing a simplified structure.

A still further aspect of the present invention provides an optical information readout apparatus wherein the first and second coil means include core members cooperating with the first and second lens holder means, respectively, to apply forces thereto when commanded by the controller.

Such a structure enables reduction in an axial length of the image forming optical section with a minimized number of component parts, enabling the image forming optical section to be formed in a compact structure.

A still further aspect of the present invention provides an optical information readout apparatus wherein the first and second lens assemblies further include first and second illumination lenses integrally formed with the first and second lenses, respectively, and carried by the first and second lens holder means, respectively.

Due to the provision of the first and second illumination lenses integrally formed with the first and second lenses, the illumination unit can be simplified in structure and, also, the illumination lenses can be shifted to proper positions through the use of the image forming optical section. This results in a compact structure of the optical information readout apparatus with the resultant decrease in electric power consumption.

The other aspect of the present invention provides an optical information readout apparatus that comprises a readout device including a photodetector and an image forming optical section having first and second lenses disposed in front of the photodetector to be movable in linearly different positions, respectively, along a light receiving optical axis of the photodetector and a focus shift device including first and second drive means operative to drivingly move the first and second lenses in the linearly different positions to change a focusing zone for an information code present in a readout object. Control means is operative to control the first or second drive means so as to linearly move the first and second lenses along the light receiving optical axis to automatically change a focal position of the image forming optical section in the occurrence of a failure in reading out the information code from image data picked up by the photodetector.

With such a structure, the first and second lenses are disposed in front of the photodetector in a linear fashion along the light receiving optical axis, resulting in reduction in the number of component parts to provide a compact structure. Further, the focus shift device is operative to drivingly move the first and second lenses in linearly different positions. Thus, different focusing zones can be along the optical axis to suit an information code present in a readout object. Also, the control means activates the focus shift device in the occurrence of any failure in reading out the information code from image data for automatically moving the first and second lenses, resulting in an increase in response in reading out optical information. That is, the focal position can be changed within the shortest period of time with high reliability in operating performance. Due to a simplified structure of the focus shift device, the control means can be configured to achieve simplified control with the resultant increase in response. Also, the focal position can be automatically changed, thereby achieving user-friendliness.

BRIEF DESCRIPTION OF THE DRAWINGS

For a better understanding of the present invention and to show how the same may be carried into effect, there will now be described by way of example only, specific embodiments according to the present invention with reference to the accompanying drawings, in which:

FIG. 2 is a view showing sequences of patterns for shift to be executed by lenses of a focus shift device;

FIGS. 4A and 4B longitudinal cross sectional views of the image forming optical section with FIG. 4A also showing a driver circuit associated with the image forming optical section while FIG. 4B shows an example of the relationship between a direction in which electrical current flows through an electromagnet coil and a direction in which an relevant lens is caused to shift;

DETAILED DESCRIPTION OF THE PREFERRED EMBODIMENTS

Now, two-dimensional code readout devices of various embodiments to which the present invention is applied are described below in detail with reference to the accompanying drawings.

First Embodiment

Figure 7:
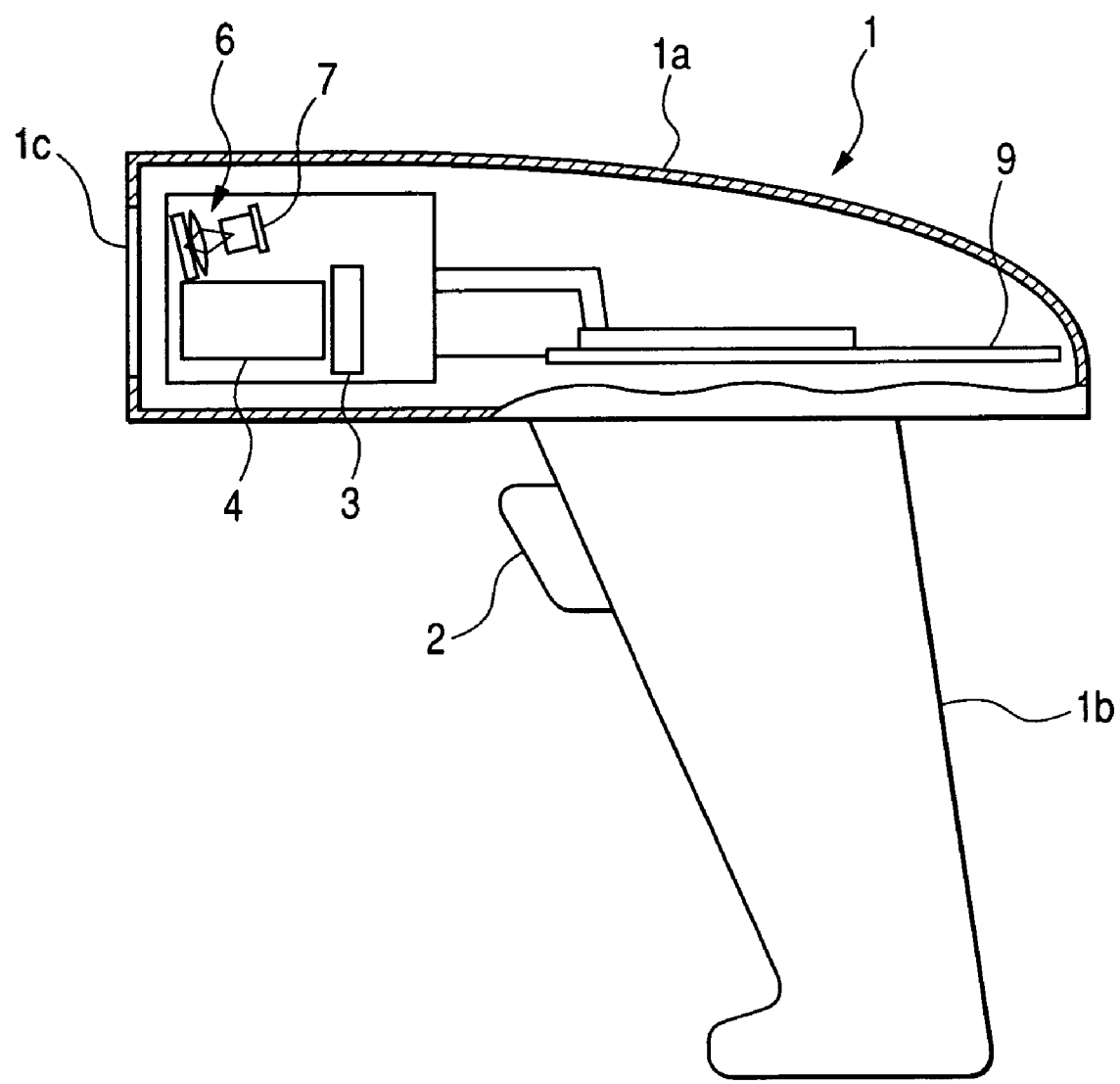
FIG. 7 is a longitudinal cross sectional view schematically showing a structure of a two-dimensional code readout device.
Figure 8:
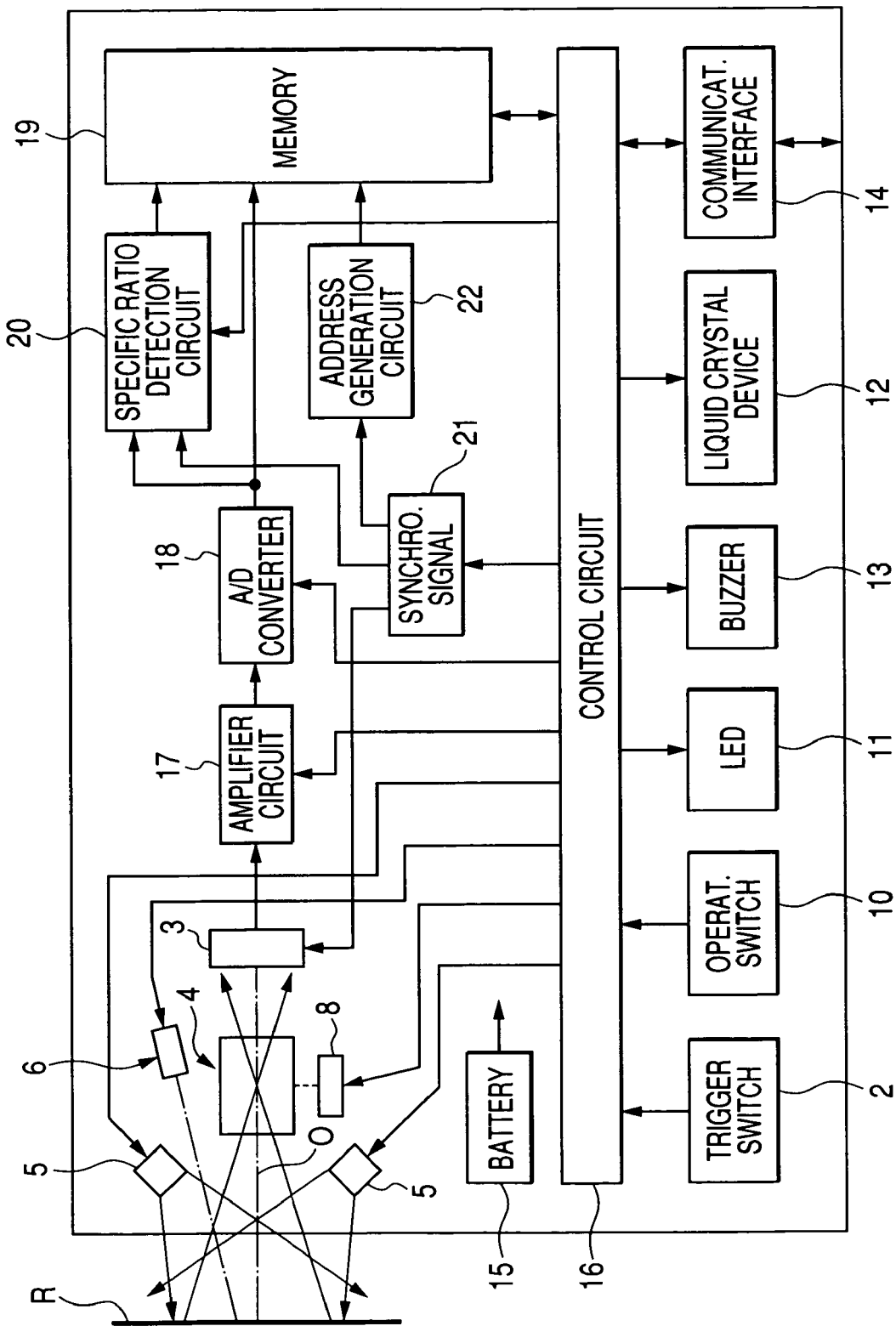
FIG. 8 is a block diagram schematically showing an electrical structure of the two-dimensional code readout device.

First, referring to FIGS. 7 and 8, description is made of an overall structure of a two-dimensional readout apparatus of an embodiment playing a role as an optical information readout apparatus. As shown in FIG. 7, the two-dimensional readout apparatus is comprised of a body case 1 that includes a main section 1a, formed in a substantially rectangular box shape with a thin configuration partly formed in a rounded shape, and a grip section 1b integrally formed at a bottom wall of the main section 1a in an area closer to a rear portion thereof to allow a user to grip the grip section 1b with a single hand for manipulation. The main section 1a of the body case 1 has a forward distal end formed with a readout opening 1c configured in a rectangular translucent shape. Also, the grip section 1b has an upper end area provided with a trigger switch 2 to input a readout command.

The main section 1a of the body case 1 has a forward end area in which a readout device is mounted to read out a QR code, such as, for instance, a two-dimensional code Q (typically illustrated only in FIGS. 1 to 1D), as an information code embedded on a readout object R (see FIG. 8) such as a label, attached onto a product, or a brochure. As shown in FIG. 8, the readout device is comprised of a photodetector 3, composed of for instance a CCD area sensor, an image forming optical section 4, illumination units 5 (not shown in FIG. 7), from which illumination lights are irradiated onto the two-dimensional code Q on the readout object R, and a marker light irradiation unit 6 adapted to irradiate a marker light onto the readout object R for indication of a readout position (in a readout range).

Among these component elements, the photodetector 3 is mounted in the main section 1a of the body case 1 at a central area thereof pointing the readout opening 1c and the image forming optical section 4 is disposed in front of the photodetector 3 to prepare an image of the information code present on the readout object R. The image forming optical section 4 takes the form of a structure composed of a plurality of lenses, whose details are described below. As described later, with the present embodiment, a focus shift device 8 is incorporated for the purpose of shifting a focal point of the image forming optical section 4. Although no detailed illustration is made, each of the plural illumination units 5 is structured to include a plurality of sets of an LED, playing a role as an illumination light source, and illumination lenses mounted in front of the LED in areas around the image forming optical section 4 (except an area above the same) pointing the readout opening 1c.

Further, the marker light irradiation unit 6 includes, in addition to a laser diode 7 playing a role as a light source, a collimator lens, a hologram operative to form a pattern for a light marker, and an aperture diaphragm that are disposed in front of the laser diode 7 in such an order. The marker light irradiation unit 6 is mounted in an upper area above the image forming optical section 4 to slightly slant downward with respect to a horizontal plane facing the readout opening 1c so as to allow the marker light to be irradiated through the readout opening 1c. Although not shown, the marker light may preferably include an L-shaped light indicating four corners in a rectangular shape formed in a slightly elongated lateral length corresponding to a shooting field and a cross-shaped light indicating a center of the L-shaped light. Moreover, the marker light irradiation unit 6 is configured such that when the two-dimensional readout apparatus is powered on, the marker light is irradiated (lighted on) at all times except when the photodetector 3 reads in (takes) an image of the two-dimensional code Q.

In operation, a user adjusts the positioning of the body case 1 so as to allow the two-dimensional code Q, present in the readout object R, to lie in a readout position (in a readout range) indicated by the marker light, upon which the user turns on the trigger switch 2. When this takes place, the illumination unit 5 irradiates an illumination light onto the two-dimensional code Q present in the readout object R through the readout opening 1c. Then, a reflection light reflected from the two-dimensional code Q is incident through the readout opening 1c to cause the image forming optical section 4 to form an image on the photodetector 3. Thus, an image of the two-dimensional code Q is retrieved.

During such an operation, a distance (a focal position) between the readout opening 1c of the device and the readout object R, to be available for information code to be favorably read out, depends on an optical characteristic (mainly involving a focusing distance) of the image forming optical section 4. In such a case, a target range suitable for the readout is regarded to lie in a range with an overall width approximately ranging from 100 to 200 mm in the vicinity (in fore and aft areas) of the focal position (with a best focus) of the image forming optical section 4. If the readout position misses the target range, then, a difficulty is encountered in executing the readout (decoding of information code). Also, a light receiving optical axis of the photodetector 3 is designated at "O" in FIG. 8.

Turning back to FIG. 7, further, the main section 1a of the case body 1 has a rear area carrying a circuit substrate 9 mounted with various circuit components shown in FIG. 8. In addition, as shown only in FIG. 8, the body case 1 has an outer wall portion (a top wall portion of the main section 1a) that is provided with an operation switch 10 available for the user to command various inputs, an alarm LED 11 and a liquid crystal display 12 or the like. The operation switch 10 plays a role as a means for setting an initial value of a readout distance that will be described later. Moreover, the body case 1 incorporates therein a buzzer 13 providing an error alarm or the like, a communication interface 14 operative to establish communication with an external system and a secondary battery 15 or the like playing a role as a drive power supply.

FIG. 8 schematically shows an electrical structure of the two-dimensional code readout device of the present embodiment. As shown in FIG. 8, the circuit substrate 9 is mainly configured with a microcomputer and carries a control circuit 16, playing a role as a controller, which executes overall controls and decoding operations. The control circuit 16 is configured to receive signals from the trigger switch 2 and the operation switch 10. To this end, the control circuit 16 is arranged to control the photodetector 3, the illumination unit 5, the marker light irradiation unit 6 and a focus shift device 8 that will be described below, enabling the execution of operation to readout an image of the two-dimensional code Q embedded on the readout object R. Moreover, the control circuit 16 controls the LED 11, the buzzer 13 and the liquid crystal display 12, while enabling data communication with an external device (such as a management computer or the like) via the communication interface 14.

Further, the circuit substrate 9 carries thereon an amplifier circuit 17, an A/D converter circuit 18, a memory 19, a specific ratio detection circuit 20, a synchronizing signal generation circuit 21 and an address generation circuit 22 or the like, all of which are controlled by the control circuit 16. With such a structure, an image pickup signal, resulting from the photodetector 3, is amplified by the amplifier circuit 17 and converted by the A/D converter circuit 18 into a digital signal for storage in the memory 19 as image data. When this takes place, also, the specific ratio detection circuit 20 is configured to detect a specific pattern among image data. The photodetector 3, the specific ratio detection circuit 20 and the address generation circuit 22 are so configured to receive a synchronizing signal from the synchronizing signal generation circuit 21. Also, the memory 19 is comprised of a non-volatile memory.

Now, the image forming optical section 4 and the focus shift device 8 of the present embodiment are described in detail with reference to FIGS. 1A to 1D to FIG. 6. As shown in FIGS. 3A to 3D and FIGS. 4A and 4B, the image forming optical section 4 is comprised of a cylindrical body 23, which is referred to as a lens tube, and two sets of first and second lenses 24, 25. The cylindrical body 23, made of non-magnetic material such as, for instance, plastic resin, takes the form of a cylindrical configuration as a whole having a light receiving optical axis "O" oriented in an axial direction. As shown in FIG. 4A, moreover, the cylindrical body 23 has an inner peripheral surface, by which the lenses 24, 25 are supported under non-rotatable statuses, and a guide recess portion 23a formed in an axial direction to guide the lenses 24, 25 along the axial direction. Also, the cylindrical body 23 is formed of a combination of two halves.

Figure 4A:
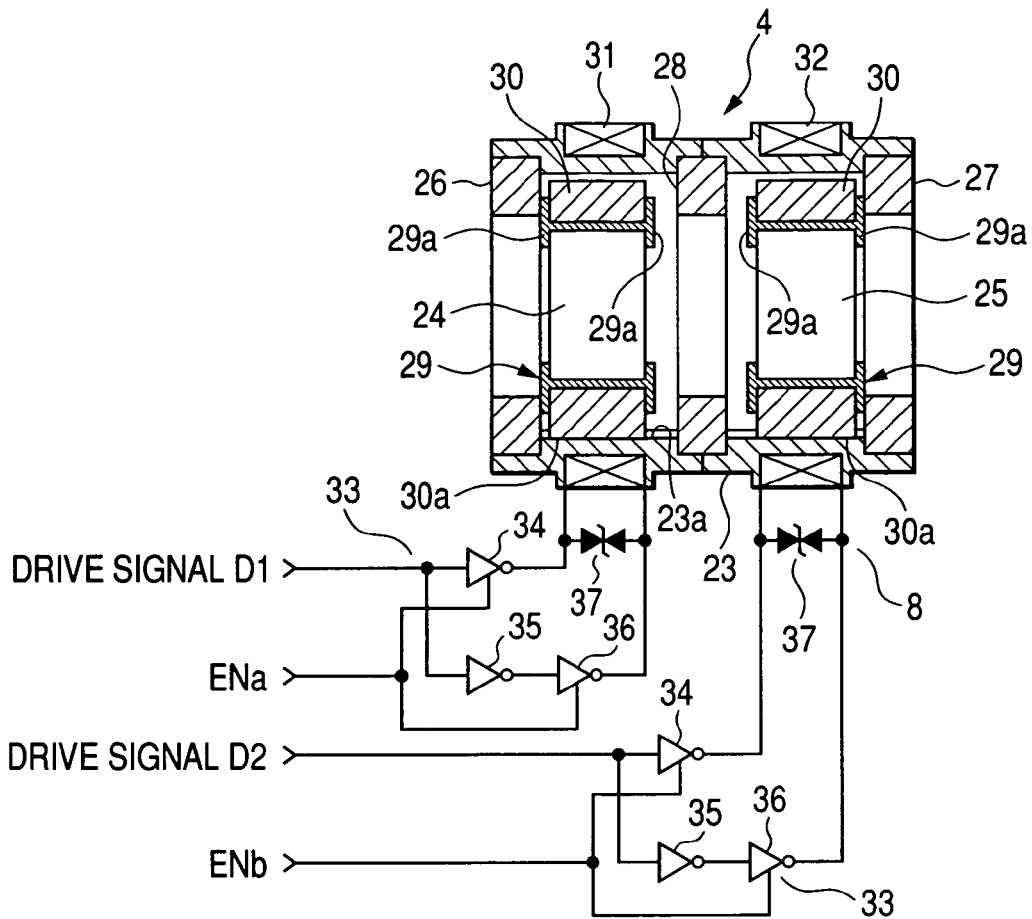
Figure 4B:
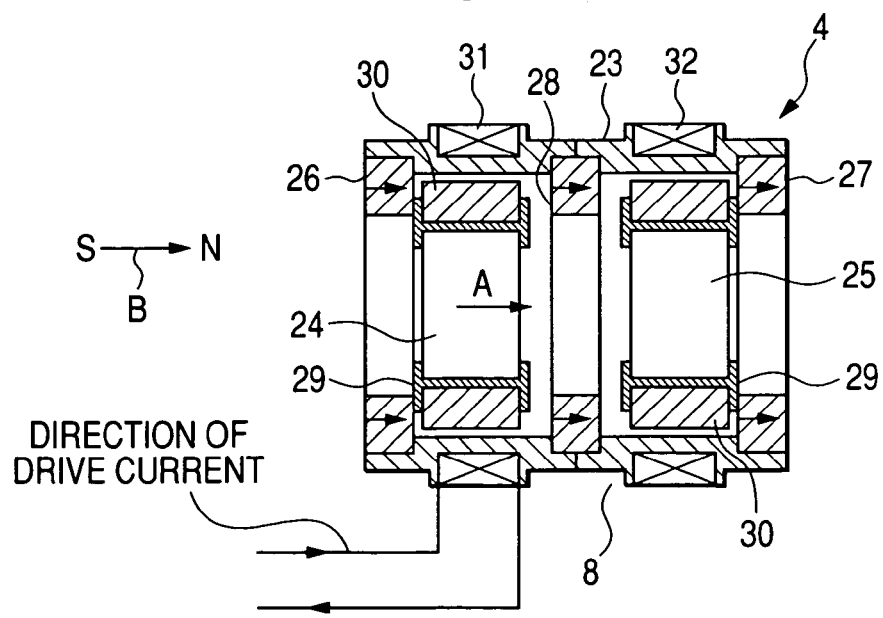

In addition, the cylindrical body 23 has an inner peripheral portion whose forward distal end (on a left side in FIG. 4A, e., g., in an area remotest from the photodetector 3) and rear base end (on a right side in FIG. 4A, e., g., in an area nearest to the photodetector 3) have inner peripheral surfaces to which first and second permanent magnets 26, 27, each formed in a ring shape, are fixedly mounted while an intermediate permanent magnet 28, formed in a ring shape, is provided in axially intermediate portion of the cylindrical body 23. As shown in FIG. 4B, all of the permanent magnets 26 to 28 have forward ends each magnetized in an S-pole and rearward ends each magnetized in an N-pole to generate magnetic fluxes (magnetic field lines) in a direction as shown by an arrow B in FIG. 4B. These permanent magnets 26 to 28 constitute a lens holder means.

Figure 5:
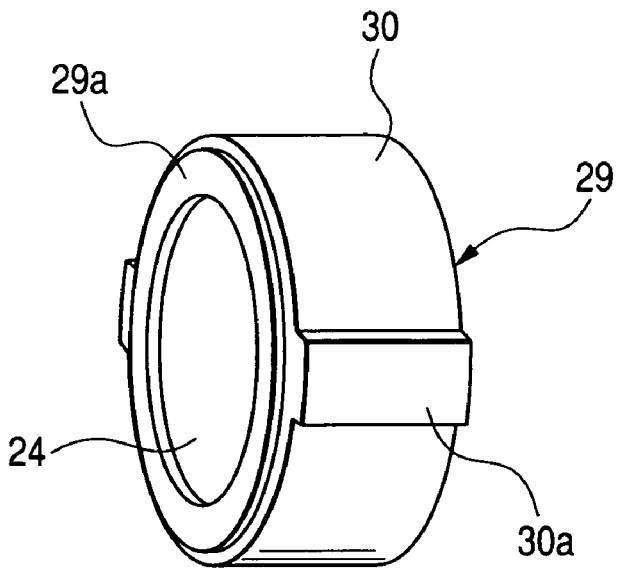
FIG. 5 is a perspective view showing how a lens holder frame carries out the lens.

On the other hand, the cylindrical body 23 incorporates therein lens holder frames 29, 29 by which the first and second lenses 24, 25 are supported. As representatively shown by the first lens 24 in FIG. 5, the lens holder frame 29, made of material with a certain dumper function such as, for instance, plastic resin material, is configured in a so-called bobbin shape that includes a body section, formed in a thin-walled cylindrical shape, whose both ends are formed with flange portions 29a, 29a. The first and second lenses 24, 25, made of materials such as, for instance, plastic resin or glass, and formed in substantially columnar shapes (in convex lens) of thin-shaped configurations, are fixedly retained by inner peripheries of the lens holder frames 29, 29, respectively. Also, each of the first and second lenses 24, 25 may include an independent lens or a combination of plural lenses (a lens group). The body section of each lens holder frame 29 has an outer periphery on which a magnetic body 30, formed of magnetic material such as, for instance, iron or the like in a ring shape that has a rectangular shape in cross section, is fixedly mounted. As shown in FIG. 5, the magnetic body 30 has an outer peripheral wall partially and integrally formed with an axially extending protruding portion 30a extending from the outer peripheral wall by a slight extent for engagement with the guide recess portion 23a of the cylindrical body 23.

The first lens 24 is held by the lens holder frame 29 and, under such a status, assumes a position between the first permanent magnet 26 and the intermediate magnet 28 in an area inside the cylindrical body 23. When this takes place, the protruding portion 30a of the magnetic body 30 is brought into engagement with the guide recess portion 23a of the cylindrical body 23 under a non-rotatable status and axially guided by the guide recess portion 23a along the optical direction "O". Thus, the first lens 24 is rendered operative to move (slide) along the optical axis "O" between a first position (a position a1 in FIG. 1A), at which a forward end face (of one flange of the lens holder frame 29) of the first lens 24 is brought into abutting engagement with the first permanent magnet 26, and a second position (a position a2 in FIG. 1A) at which an end face (of the other flange of the lens holder frame 29) of the first lens 24 is brought into abutting engagement with the intermediate permanent magnet 28.

Likewise, the second lens 25 is held by the second lens holder frame 29 and, under a status, assumes a position between the intermediate magnet 28 and the second permanent magnet 2 in an area inside the cylindrical body 23. When this takes place, the protruding portion 30a of the magnetic body 30 is brought into engagement with the guide recess portion 23a of the cylindrical body 23 under a non-rotatable status and axially guided by the guide recess portion 23a along the optical direction "O". Thus, the second lens 25 is rendered operative to move (slide) along the optical axis "O" between a first position (a position b1 in FIG. 1A), at which a forward end face (of one flange of the second lens holder frame 29) of the second lens 25 is brought into abutting engagement with the intermediate permanent magnet 28, and a second position (a position b2 in FIG. 1A) at which an end face (of the other flange of the other lens holder frame 29) of the first lens 24 is brought into abutting engagement with the second permanent magnet 27.

Under such circumstances, the first magnetic body 30 is subjected to an attraction force of either the first permanent magnet 26 or the intermediate permanent magnet 28 to cause the first lens 25 to remain halted at any of the positions a1, a2 in a relevant fixed position. Moreover, the second magnetic body 30 is subjected to attraction force of either the intermediate permanent magnet 28 or the second permanent magnet 27 to cause the second lens 24 to remain halted at any of the positions b1, b2 in a relevant fixed position. Also, with the present embodiment, a distance between the positions a1, a2 is set to approximately double the distance between the positions b1, b2 as shown only in FIGS. 1A to 1D.

As shown in FIGS. 3A to 3D and FIGS. 4A and 4B, further, the cylindrical body 23 has a first outer periphery that carries a first coil 31, located in an area corresponding to a position between the first permanent magnet 26 and the intermediate permanent magnet 28, which plays a role as a first drive means. Likewise, the cylindrical body 23 has a second outer periphery that carries a second coil 32, located in an area corresponding to a position between the intermediate permanent magnet 28 and the second permanent magnet 27, which plays a role as a second drive means.

With such a structure, due to the first magnetic body 30 attracted by the first permanent magnet 26 or the intermediate permanent magnet 28 under a normal condition (under a non-conductive condition of the first coil 31), the first lens 24 remains halted in either the position a1 or a2. With the first coil 31 being energized in a given direction, the first magnetic body 30 acts repulsively against the first permanent magnet 26 or the intermediate permanent magnet 28 due to a magnetic field generated by the coil 31 to cause the first lens 24 to draw apart from the relevant stop position to the other position a2 or a1.

Similarly, under the normal condition (under the non-conductive state of the second coil 32), the second lens 25 remains halted in either the position b1 or b2. Under such a status, with the second coil 32 rendered conductive in a given direction, the second lens 25 is drawn apart from the relevant stop position to the other position b2 or b1. Also, during such movements, although the first and second lenses 24, 25 are brought into impact with any one of the permanent magnets 26 to 28, the flange portions of the first and second lens holder frames 29, made of relatively soft material, effectively alleviate such an impact.

The first and second coils 31, 32 are controllably turned on in response to first and second drive signals delivered from the control circuit 16 using first and second driver circuits 33 shown in FIG. 4A. The driver circuits 33 are configured to apply first and second drive signals D1, D2, delivered from the control circuit 16, to one terminals of the first and second coils 31, 32 via first inverter circuits 34, 34, respectively, and to the other terminals of the first and second coils 31, 32 via second and third inverter circuits 35, 36, respectively. Further, the control circuit 16 is arranged to apply first and second enable signals ENa, ENb to the first and third inverter circuits 34, 36, respectively. Moreover, first and second zener diodes 37 are connected between the associated terminals of the first and second coils 31, 32, respectively, to establish constant voltage ratios.

Figure 6A:
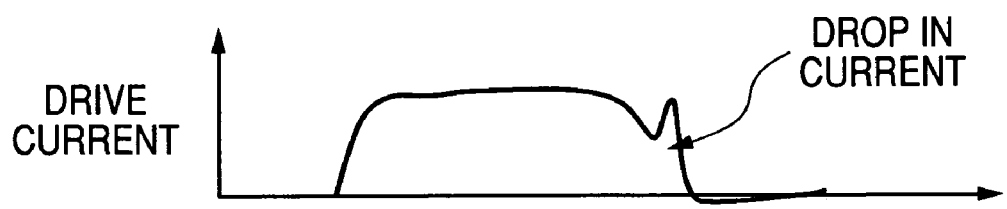
FIGS. 6A and 6B show a waveform of a drive current and a waveform of a drive signal.
Figure 6B:
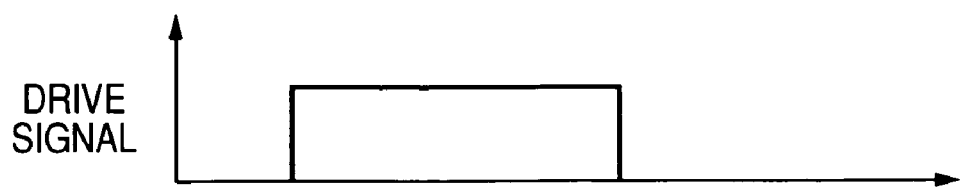

With such a structure set forth above, for instance, if a drive current flows through the first coil 31 in a direction as shown in FIG. 4B under a circumstance where the first lens 24 remains halted in the position a1, the first magnetic body 30 is attracted in a direction as shown by an arrow A in FIG. 4B to shift the first lens 24 to the position a2 in the same direction. Under such a situation, also, the control circuit 16 controls output values of the drive signals being applied to the first and second coils 31, 32 upon monitoring magnitudes of the drive currents flowing through the first and second coils 31, 32. Then, the control circuit 16 makes judgment that the shifts of the first and second lenses 24, 25 have been completed at timing when the drive current drops as shown in FIG. 6A, thereby interrupting the generations of the first and second drive signals.

With such a structure mentioned above, the focus shift device 30 is provided to enable a shift of a focal point of the image forming optical section 4 upon free and independent movements of the first and second lenses 24, 25 along the optical axis "O" (in positional displacement between two points). Under such circumstances, the image forming optical section 4 is rendered operative to change focal points in four stages as illustrated in FIGS. 1A to 1D and FIGS. 3A to 3D.

Figure 1A:
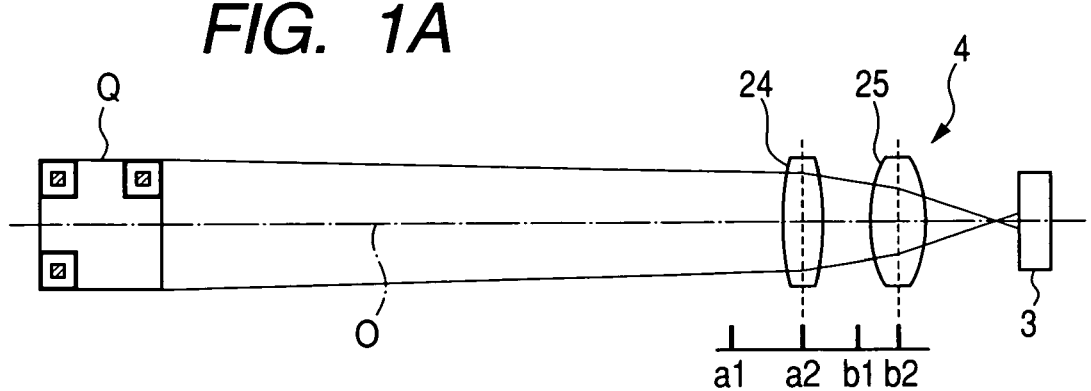
FIGS. 1A to 1D are schematic views illustrating an optical information readout apparatus of a first embodiment according to the present invention to show the relationships between first and second lenses and associated focal positions.
Figure 1B:
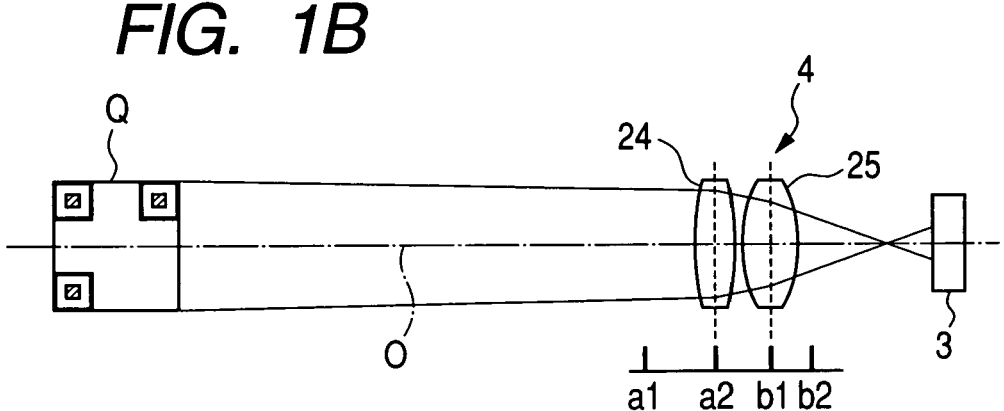
Figure 1C:
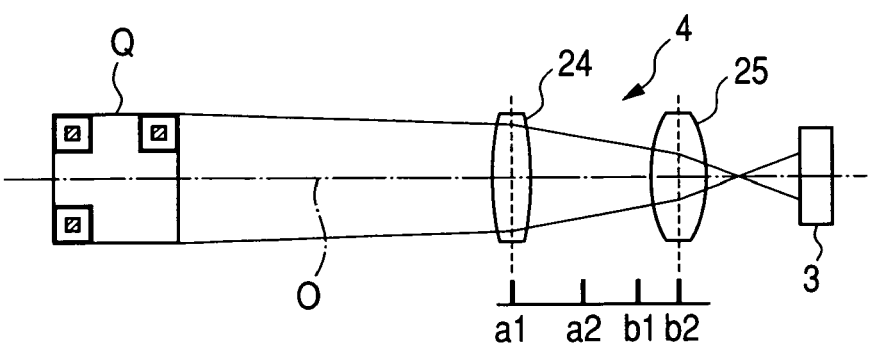
Figure 1D:
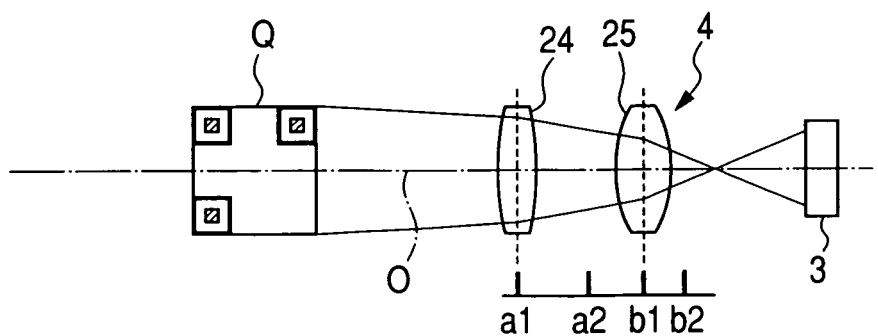
Figure 3A:
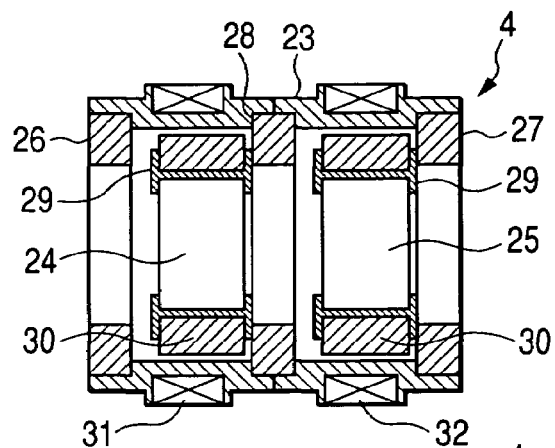
FIGS. 3A to 3D are longitudinal cross sectional views showing four kinds of patterns in position of the lenses forming an image forming optical section.
Figure 3B:
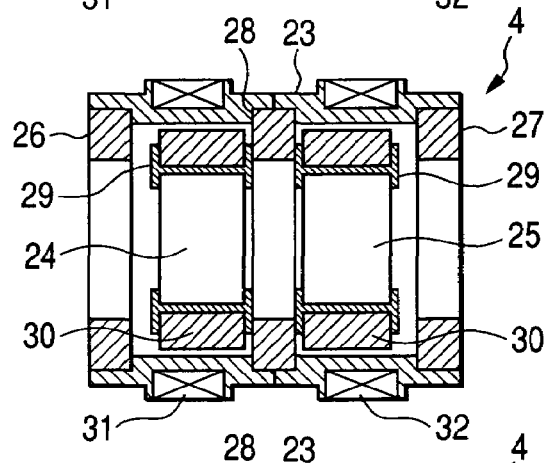
Figure 3C:
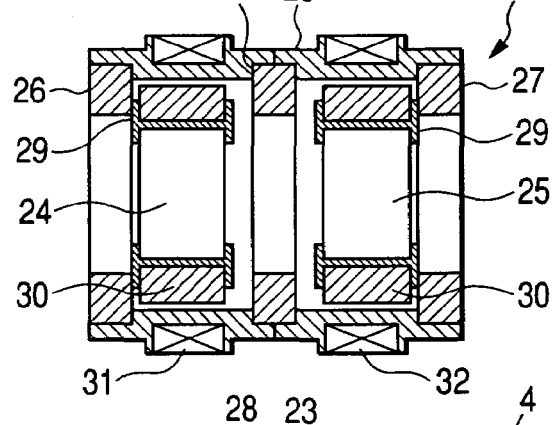
Figure 3D:
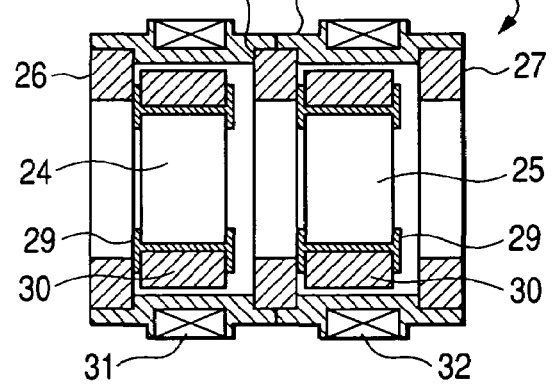

That is, as shown in FIGS. 11A and 3A, a condition where the first lens 24 is located at the position a2 closer to the photodetector 3 and the second lens 25 is located at the position b2 closer to the photodetector 3 is referred to as a pattern (1) under which the image forming optical section 4 has the remotest focal position. As shown in FIGS. 1B and 3B, a condition where the first lens 24 is located at the position a2 closer to the photodetector 3 and the second lens 25 is located at the position b1 remote from the photodetector 3 is referred to as a pattern (2) under which the image forming optical section 4 has a second remotest focal position. As shown in FIGS. 1C and 3C, a condition where the first lens 24 is located at the position a1 remote from the photodetector 3 and the second lens 25 is located at the position b2 closer to the photodetector 3 is referred to as a pattern (3) under which the image forming optical section 4 has a third remotest focal position. As shown in FIGS. 1D and 3D, a condition where the first lens 24 is located at the position a1 remote from the photodetector 3 and the second lens 25 is located at the position b1 remote from the photodetector 3 is referred to as a pattern (4) under which the image forming optical section 4 has the shortest focal position.

By the way, as will be described below with reference to the operations being subsequently described, the control circuit 16 incorporates a software structure, through which a readout control program is executed, and is configured to execute readout operation in which the photodetector 3 picks up an image of the two-dimensional code Q recorded on the readout object R. In addition to such an operation, when a failure occurs in readout (decoding) of the two-dimensional code Q, the control circuit 16 controls the focus shift device 8 to automatically change the focal positions (under the shift patterns for the first and second lenses 24, 25) for execution of subsequent readout operation. Accordingly, the control circuit 16 plays a role as a control unit (means).

During such an operations, the present embodiment allows a user to manipulate the operation switch 10 for enabling the presetting of an initial value of a readout distance. Depending on such a preset initial value, the control circuit 16 is operative to set the first and second lenses 24, 25 to respective initial values in any of the patterns (1) to (4) in response to the preset initial value. Thus, when the optical information readout apparatus is powered on, the first and second lenses 24, 25 are restored to their initial positions, respectively, at all times. Also, the current positions of the first and second lenses 24, 25 are stored in and updated by the non-volatile memory at all times.

In addition, in automatically changing the focal positions of the image forming optical section 4, the control circuit 16 is operative to change the shift pattern of the first and second lenses 24, 25 in a sequence determined for each initial position. For instance, with the first and second lenses 24, 25 remaining under initial positions in the pattern (1), if a failure occurs in executing the readout operation at such positions, then, the control circuit 16 switches the pattern (1) over to the pattern (2) for the execution of subsequent readout operation. If another failure occurs in readout operation even at such an operations, then, the pattern (3) is selected for the execution of further subsequent readout operation. If still another failure occurs in readout operation even at such an operations, then, the pattern (4) is selected for the execution of still further subsequent readout operation. Also, if the readout operations are failed in all of the positions (under all the shift patterns), then, judgment is made that the readout operation is impossible, thereby making an error alarm.

With the two-dimensional code readout device of such a structure, in reading out the two-dimensional code Q recorded on the readout object R, the user moves the body case 1 to a position away from the readout object R distanced by a suitable (arbitrary) length while adjusting the positioning of the readout opening 1c in alignment with the readout object R using the marker light. Under such a condition, the user operatively depresses the trigger switch 2. Then, the control circuit 16 is rendered operative to execute the readout operation of the two-dimensional code Q. This readout operation is executed such that as previously mentioned, when the marker light is turned off, the illumination unit 5 irradiates the illumination light onto the two-dimensional code Q, recorded on the readout object R, through the readout opening 1c to cause a reflection light from the two-dimensional code Q to be incident through the readout opening 1c to pass through the first and second lenses 24, 25 of the image forming optical section 4 in this order to form an image on the photodetector 3.

During such an operations, the first and second lenses 24, 25 of the image forming optical section 4 take the respective initial positions (in any of the patterns (1) to (4)) depending on the preset initial values on the preset readout distance, resulting in the presence of a focal position depending on the relevant pattern. Accordingly, if a distance between the device and an actual readout object R is associated with the focal position of the image forming optical section 4, then, the readout operation can be performed in an appropriate way. On the contrary, in an event that the user attempts to perform the readout operation under circumstances where a distance between the device and the actual readout object R is relatively short in spite of a condition where the distance between the device and the actual readout object R is deviated from the current readout position, that is, for instance, a condition where the first and second lenses 24, 25 take the initial positions under the pattern (1), the focal position of the image forming section 4 is deviated from an appropriate readout position (focal position), resulting in the occurrence of a failure in the readout operation.

Upon the occurrence of the failure in the readout operation, the control circuit 16 controllably drives the first and second coils 31, 32 of the focus shift device 8 to automatically change the shift positions, that is, the focal positions, of the first and second lenses 24, 25, upon which subsequent readout operation is executed. During such an operations, the shift positions (patterns) of the first and second lenses 24, 25 are altered in a manner as shown in FIG. 2.

More particularly, in initial positions under a first pattern (1), the first lens 24 assumes a position a2 and the second lens 25 assumes a position b2. If readout operation is failed under the pattern (1), then, a pattern (2) is selected. If further readout operation is failed under the pattern (2), then, a pattern (3) is selected. If subsequent readout operation is failed under the pattern (3), then, a pattern (4) is selected.

In the initial positions under the pattern (2), the first lens 24 assumes the position a2 and the second lens 25 assumes a position b1. If readout operation is failed under the pattern (2), then, the pattern (3) is selected. If further readout operation is failed under the pattern (3), then, the pattern (4) is selected. If subsequent readout operation is failed under the pattern (4), then, the pattern (1) is selected.

In the initial positions under the pattern (3), the first lens 24 assumes the position a1 and the second lens 25 assumes the position b2. If readout operation is failed under the pattern (3), then, the pattern (2) is selected. If further readout operation is failed under the pattern (2), then, the pattern (1) is selected. If subsequent readout operation is failed under the pattern (1), then, the pattern (4) is selected.

In the initial positions under the pattern (4), the first lens 24 assumes the position a1 and the second lens 25 assumes the position b2. If readout operation is failed under the pattern (4), then, the pattern (3) is selected. If further readout operation is failed under the pattern (3), then, the pattern (2) is selected. If subsequent readout operation is failed under the pattern (2), then, the pattern (1) is selected.

Thus, an appropriate focal position is selected from among the four kinds of different focal positions of the image forming optical section 4 for the execution of the readout operation. Accordingly, the appropriate focal position can be obtained at all times even if the distance between device and the readout object R marks any distance. This results in a capability of achieving favorable readout operation, enabling a remarkable increase in a target range of a readout enabling distance as a whole.

Thus, with the present embodiment, it is so structured that the image forming optical section 4 is comprised of the first and second lenses 24, 25 movable between two positions along the optical axis "O" and the focus shift device 8 is arranged to move the first and second lenses 24, 25 to be independent from each other. With such a structure, the image forming optical section 4 is able to obtain the four kinds of different focal positions through the use of a combination of the positions of the first and second lenses 24, 25, resulting in an increase in the target range of the readout enabling distance. The provisions of two lenses 24, 25 suffice to obtain the four kinds of different focal positions, resulting in a decrease in the number of component parts while providing a compact layout in arrangement. Due to a need for merely shifting the positions between two points of the two lenses 24, 25, the focal positions can be changed within the shortest period of time. This results in the control circuit 16 being able to achieve simplified control with increased response capability. Since the focal positions can be automatically changed, a user can easily perform the operations.

Further, the present embodiment takes the form of a structure wherein under nonconductive states of the coils 31, 32, three permanent magnets 26 to 28 hold the first and second lenses 24, 24 in the respective shift positions. This enables a lens holder means to be formed in a simplified structure and no electric power is needed for the first and second lenses 24, 24 to be retained in such shift positions during stopped conditions of the first and second lenses 24, 24, resulting in an advantage of minimizing electric power consumption.

Second to Fourth Embodiments and Other Embodiment

Figure 9:
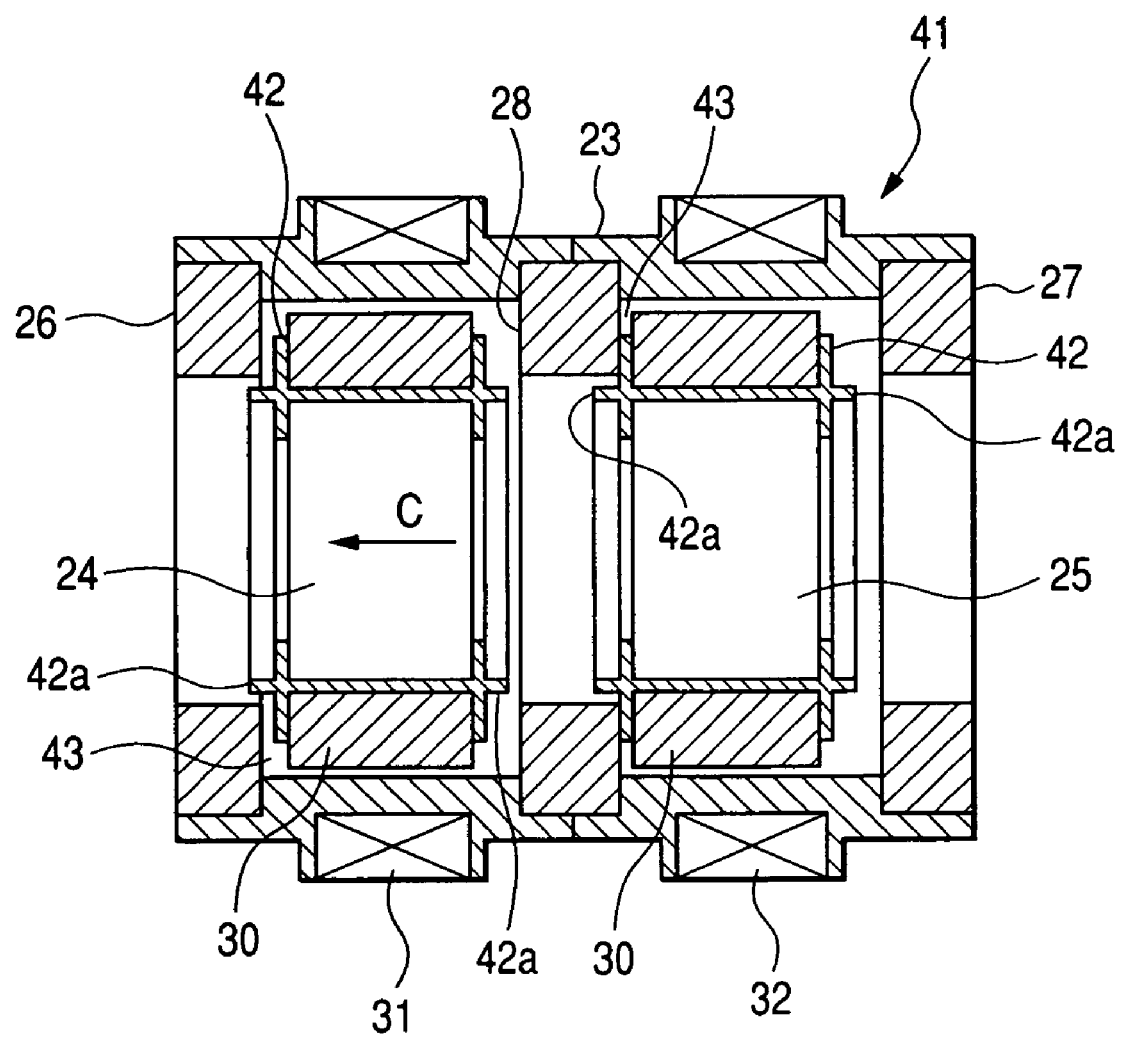
FIG. 9 shows a second embodiment according to the present invention with an image forming optical section shown in a longitudinal cross sectional view.
Figure 10:
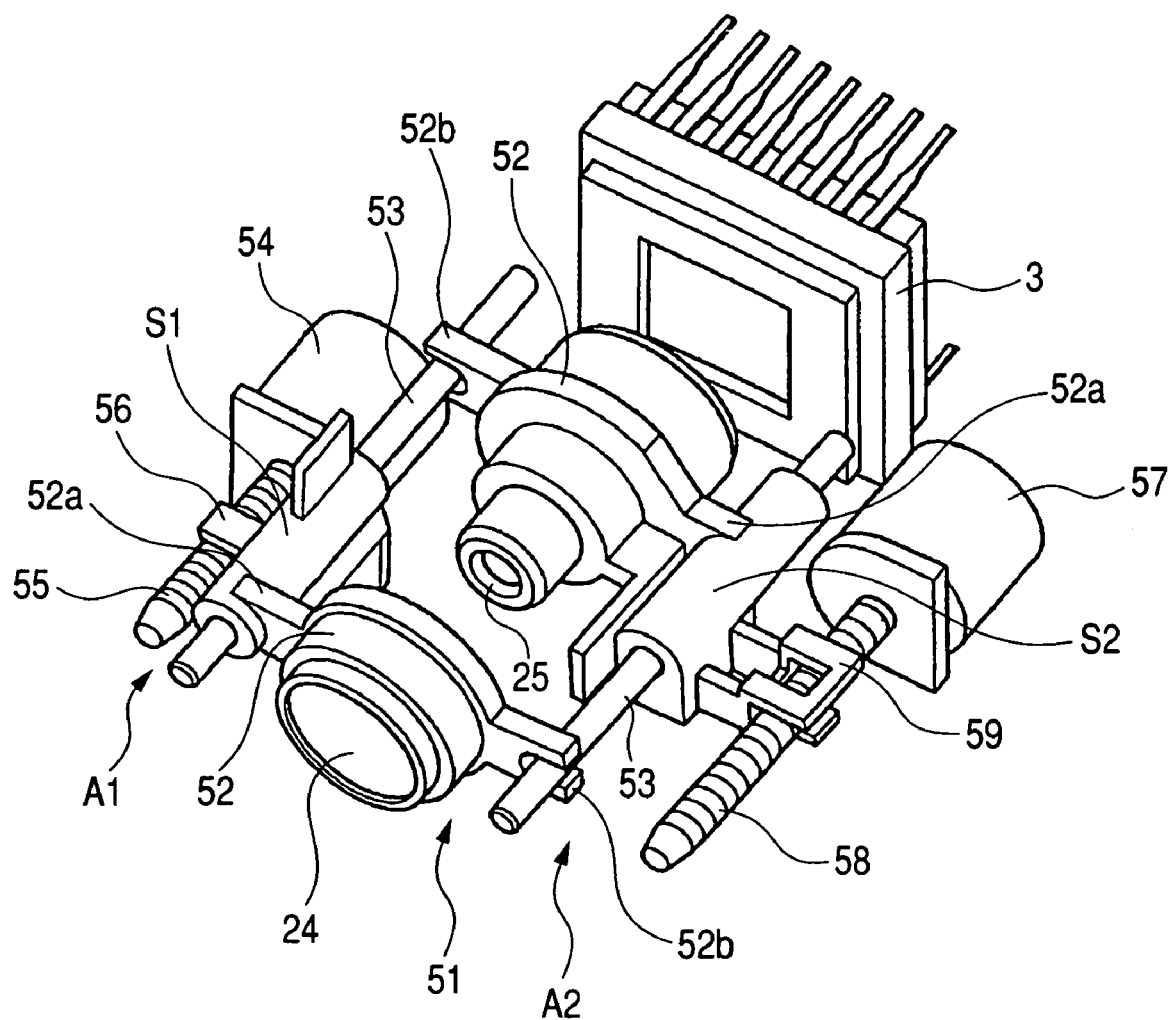
FIG. 10 shows an optical information readout apparatus of a third embodiment according to the present invention with an image forming optical section and a drive mechanism schematically shown in a perspective view.
Figure 11:
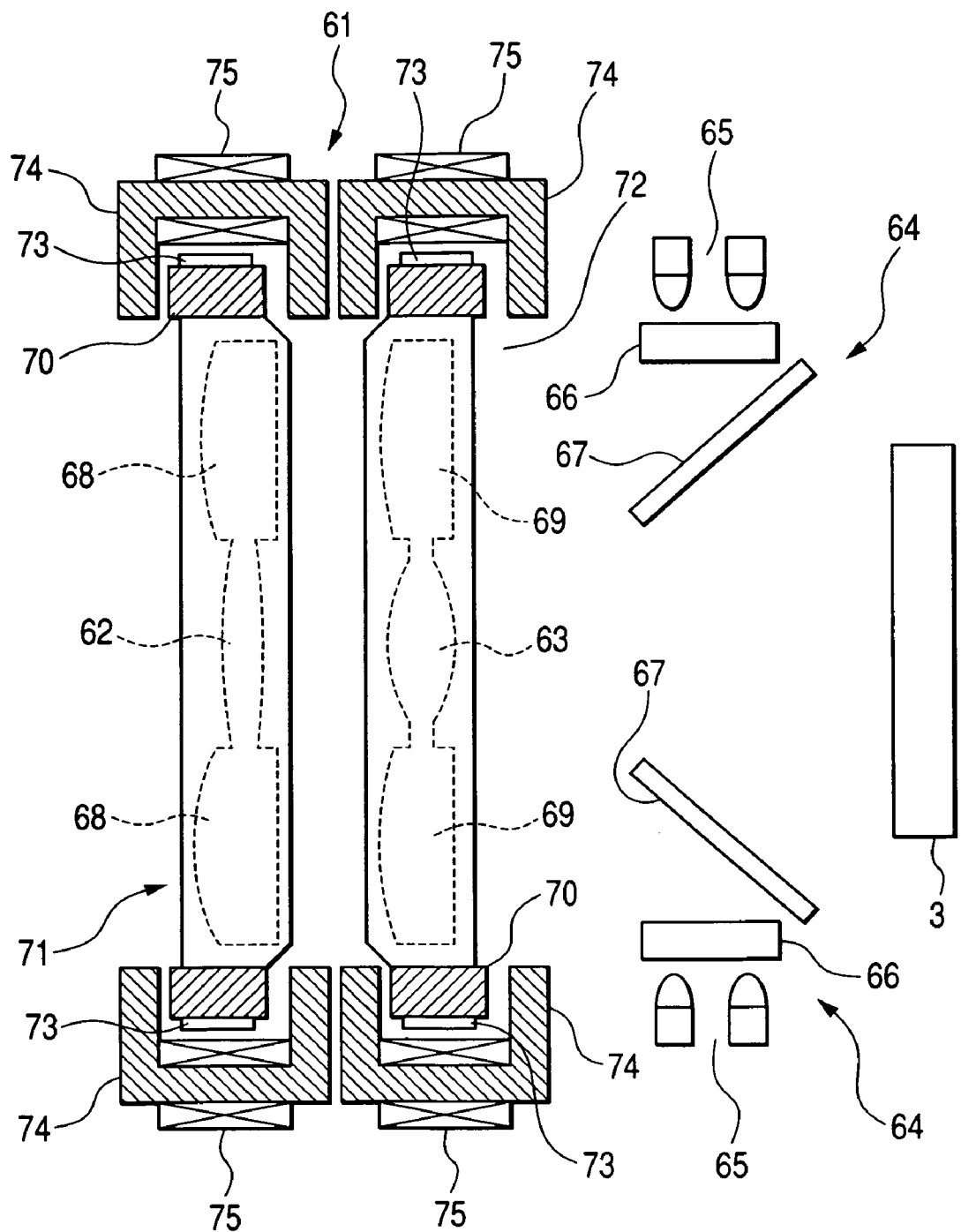
FIG. 11 is a cross sectional view of a fourth embodiment according to the present invention schematically showing a structure of a readout section.

FIGS. 9 to 11 show image forming sections related to two-dimensional code readout apparatuses of second to fourth embodiments according to the present invention. Like the first embodiment, these embodiments are applied to two-dimensional code readout apparatuses of a gun type playing a role as optical information readout apparatuses, respectively, and the same component parts as those of the first embodiment bear like reference numerals for omitting new illustrations and detailed descriptions. Hereunder, these embodiments are described with a focus on differing points.

FIG. 9 shows the second embodiment according to the present invention. The second embodiment differs from the first embodiment in respect of a structure of an image forming optical section 41. The image forming optical section 41 includes the cylindrical body 23, having an inner periphery by which the ring-shaped permanent magnets 26 to 28 are fixedly supported in axially spaced positions and an outer periphery carrying the first and second coils 31, 32 at axially spaced positions.

With the present embodiment, the cylindrical body 23 incorporates therein first and second cylindrically bobbin-shaped lens holder frames 42, 42 at axially spaced positions that have inner peripheries, by which the first and second lenses 24, 25 are fixedly supported, and outer peripheries on which the first and second magnetic bodies 30, 30 are supported, respectively. The lens holder frames 42, 42 have fore and aft ends integrally formed with upright wall portions 42a, 42a, respectively, each axially extending outward by a slight length. The upright wall portions 42a take the form of cylindrical shapes that extend through the inner walls of the associated ring-shaped permanent magnets 26 to 28 with a slight clearance with respect to the inner peripheries of the same. With such structures, air brake chambers 43, 43 are defined among the ring-shaped permanent magnets 26 to 28, the lens holder frames 42, 42 (the first and second magnetic bodies 30, 30) and inner peripheral walls of the cylindrical body 23 under circumstances where the first and second lenses 24, 25 (flange portions of the first and second lens holder frames 42, 42) move closer to stop positions in abutting engagement with at least either one of the permanent magnets 26 to 28.

Thus, if the first lens 24 axially moves in a direction as shown by an arrow C (toward the position a1) as shown in FIG. 9, the air brake chamber 43 is formed in a space defined by a rear end face of the first permanent magnet 26, a forward end face of the first lens holder frame 42 of the first lens 24 and the inner periphery of the cylindrical body 23, causing air prevailing in the air brake chamber 43 to be compressed for thereby exerting a braking force onto the first lens holder frame 42. Thus, with the second embodiment, using a simplified structure allows reduction in impact forces to be applied to the first and second lenses 24, 25 during movements thereof.

FIG. 10 shows a third embodiment according to the present invention. The third embodiment differs from the first embodiment in respect of structures of an image forming optical section and drive units of a focus shift device. In particular, the image forming optical section 51 is structured to have the first and second lenses 24, 25, mounted in front of the photodetector 3, which are carried by first and second lens holder frames 52, 52, respectively. The first and second lens holder frames 52, 52 are supported on both side portions by first and second actuating sections A1, A2 composed of first and second guide shafts 53, 53 extending parallel to a light receiving optical axis "O".

More particularly, the first and second lens holder frames 52, 52 have laterally extending guide portions 52a, 52b, respectively. The guide portions 52a, 52a of the first and second lens holder frames 52, 52 are connected to the first and second actuating sections A1, A2, respectively. The first and second actuating sections A1, A2 includes first and second slide members S1, S2 slidably carried on the guide shafts 53, 53, respectively. The guide portions 52b, 52b of the first and second lens holder frames 52, 52 are slidably carried on the guide shafts 53, 53, respectively. The first and second actuating sections A1, A2 further includes a first lead screw 55 that is rotatably driven by a first stepping motor 54, playing a role as a drive source, and extends in parallel to the associated guide shaft 53 at a position adjacent the slide member S1. The first slide member S1 has a rack 56 formed with a rack gear portion (not shown) in meshing engagement with the first lead screw 55. Although not shown, an urging means, such as a spring or the like, may be provided to urge the rack gear portion toward the first lead screw 55. Thus, a first drive means (unit) is structured for shifting the first lens 24 in different positions along the optical axis "O".

The first and second actuating sections A1, A2 further includes a second lead screw 58 that is rotatably driven by a second stepping motor 57, playing a role as a second drive source, and extends in parallel to the associated guide shaft 53 at a position adjacent the second slide member S2. The second slide member S2 has a rack 59 formed with a rack gear portion (not shown) in meshing engagement with the second lead screw 58. Although not shown, an urging means, such as a spring or the like, may be provided to urge the rack gear portion toward the second lead screw 58. Thus, a second drive means (unit) is structured for shifting the second lens 24 in different positions along the optical axis "O". The control circuit 16 controls the first and second stepping motors 54, 57.

With such a structure set forth above, the first and second stepping motors 54, 57 rotate the first and second lead screws 55, 58, respectively, thereby enabling the first and second lens holder frames 52, 52 and accordingly the first and second lenses 24, 25 to be independently shifted in different shift positions. When this takes place, the provision of the urging means to urge the rack gear portions toward the lead screws 55, 58 makes it able for the racks 56, 59 to be held in meshing engagement with the lead screws 55, 58 with no backlash.

FIG. 11 shows the fourth embodiment according to the present invention. With the fourth embodiment, an image forming optical section 61 has a structure that includes first and second lenses 62, 63 mounted in front of the photodetector 3. Two sets of illumination units 64, 64 are located in areas on one side of the image forming optical section 61 in a symmetric fashion to irradiate illumination lights onto a readout object. Each illumination unit 64 is comprised of a plurality of LEDs 65, playing a role as an illumination source, a barrel-shaped lens 66 disposed in front of the LEDs 65 to condense the lights emitted from the LEDS 65, a mirror reflector 67 that reflects the lights from the barrel-shaped lens 66 toward a forward area at a substantially right angle, and first and second illumination lenses 68, 69 disposed in front of the mirror reflector 67.

With the structure mentioned above, the first illumination lenses 68, 68 are integrally formed with the first lens 62 at an outer peripheral area thereof in a radial direction under which the first lens 62 is fixedly supported by a first lens holder frame 70, thereby constituting a first lens assembly 71. Likewise, the second illumination lenses 69, 69 are integrally with the second lens 63 at an outer peripheral area thereof in a radial direction under which the second lens 63 is fixedly supported by a second lens holder frame 70, thereby constituting a second lens assembly 72. The first and second lens assemblies 71, 72 are configured to be movable along the optical axis "O" between two points.

The first and second lens assemblies 71, 72 have outer peripheries on which first and second permanent magnets 73, 73 are mounted respectively. First and second magnet cores 74, 74, each formed in a U-shape in cross section, carry first and second coils 75, 75, respectively, which are located in positions radially outward of the first and second lens assemblies 71, 72, respectively. Thus, four sets of electromagnets are provided as drive means (units). The control circuit 16 is configured to control these electromagnets (the first and second coils 75, 75).

With such a structure mentioned above, the first illumination lenses 68, 68 are caused to move in a unified manner with the first lens 62 and the second illumination lenses 69, 69 are caused to move in a unified manner with the second lens 63. This makes it possible to collectively cause the alteration of a focal position of the image forming optical section 61 and the alteration of a target range to be illuminated by the illumination unit 64. By taking the form of a structure wherein a field angle of the readout device (the image forming optical section 61) and the illuminating range of the illumination unit are caused to vary in a similarity fashion upon movements of the first and second lenses 62, 63 followed by the movements of the illumination lenses 68, 69, an appropriate illuminating range can be obtained to suit the field angle of the readout device.

Also, the present invention is not limited to the embodiments set forth above and may be implemented in extensions or alterations described below.

That is, although not shown, with a structure incorporating a marker light illumination unit adapted to include a light source and a marker lens to irradiate a marker light onto a readout object R for pointing out a readout position thereon, an alternative structure may be provided, like the fourth embodiment set forth above, wherein the marker lens is linked with the first or second lens for unitary movements.

This enables the movement of the focal position of the image forming optical section and associated alteration of an illumination field angle of the marker light to be collectively performed. By taking the form of a structure to allow the field angle to be provided by the readout device and the illumination field angle of the marker light to be provided by the marker light illumination unit to vary in a similarity fashion depending on the movement of the first or second lens and the associated movement of the marker lens, it becomes possible to obtain an appropriate illumination field angle of the marker light with respect to the field angle of the readout device. It is of course to be appreciated that the image forming optical section, the illumination lens and the marker lens may be configured to move in a unitary fashion.

Further, while the present invention has been described above with reference to the structures wherein the movements in shifting the locations (in shift patterns) of the first and second lenses 24, 25 involve the shifting between the patterns (1) and (2) and the shifting between the patterns (2) and (3), the present invention may be altered such that during the operation to shift the focal position of the image forming optical section at first time, only either one of the first and second drive means is operated. This enables the drive means to operate in less drive current, resulting in reduction in electric power consumption.

With the embodiments set forth above, the optical information readout apparatus of the present invention has been described as applied to an exemplary case for reading out the two-dimensional code Q, i.e., particularly the QR code, as an information code, the present invention may have other applications in which the other kinds of two-dimensional codes are read out or in which a single dimensional code such as a bar code is read out. In addition, the optical information readout apparatus of the present invention is not limited to the gun type and may take the form of a hand-held type structure or another structure that is fixedly assembled to an FA system (with a structure wherein an information code is readout at a remote position under circumstances where a readout object is variable in position). Moreover, the present invention may take the form of overall hardware structures in various alterations. Thus, the present invention is not limited to the various embodiments set forth above and may be implemented in suitable modifications without departing from a scope of the present invention.

What is claimed is:

1. An optical information readout apparatus comprising:
    a readout device including a photodetector and an image forming optical section having first and second lenses disposed in front of the photodetector along a light receiving optical axis;
    a focus shift device operative to move the first and second lenses in linearly different positions to change a focusing zone for an information code present in a readout object; and
    a controller operative to control the focus shift device in the occurrence of a failure in reading out the information code from image data, picked up by the photodetector, so as to linearly move the first and second lenses in the different positions along the light receiving optical axis to automatically change a focal position of the image forming optical section,
    wherein the focus shift device includes drive means, associated with the first and second lenses, respectively, which are operative to independently move the first and second lenses in the different positions along the light receiving optical axis,
    wherein the focus shift device further includes lens holder means operative to hold the first and second lenses in the different positions, respectively, under a nonconductive state of the drive means.

2. The optical information readout apparatus according to claim 1, wherein:
    the lens holder means includes magnetic bodies associated with the first and second lenses, respectively, and permanent magnets by which the magnetic bodies are attracted to retain the first and second lenses in shifted positions, respectively.

3. The optical information readout apparatus according to claim 1, wherein:
    the focus shift device further includes air brake chambers adapted to be defined when the first and second lenses move closer to at least stop positions, respectively, to compress air in the air brake chambers for thereby generating braking forces during movements of the first and second lenses.

4. The optical information readout apparatus according to claim 1, wherein:
    the focus shift device further includes first and second linearly movable lens holder means by which the first and second lenses are fixedly supported, respectively; and
    the drive means comprises first and second actuating sections connected to the first and second lens holder means, respectively, and including first and second guide shafts, extending parallel to the light receiving optical axis to guide the first and second lens holder means along the optical axis, and first and second drive motors operatively connected to the first and second actuating sections to linearly move the first and second lens holder means, respectively.

5. The optical information readout apparatus according to claim 4, wherein:
    the first and second actuating sections further include first and second lead screws, drivingly rotated by the first and second drive motors, respectively, to move the first and second lens holder means along the optical axis, and first and second racks in meshing engagement with the first and second lead screws, respectively, to move the first and second lens holder means along the optical axis.

6. The optical information readout apparatus according to claim 5, wherein:
    the controller is operative to control either one of the first and second drive motors such that the first and second lenses are shifted to the focal position of the image forming optical section at one time.

7. The optical information readout apparatus according to claim 1, further comprising:
    an illumination unit including an illumination source and an illumination lens, operative to irradiate an illumination light from the illumination source onto the readout object, which is associated with the first or second lenses for unitary movement therewith.

8. The optical information readout apparatus according to claim 7, wherein:
    a field angle of the readout device and an illuminating range are made variable in a similarity fashion due to movements of the first or second lenses and associated movement of the illumination lens.

9. The optical information readout apparatus according to claim 1, further comprising:
    a marker light irradiating section including a light source and a marker lens, operative to irradiate a marker light onto the readout object to designate a readout position, which is associated with the first or second lenses for unitary movement therewith.

10. The optical information readout apparatus according to claim 9, wherein:
    a field angle of the readout device and a marker light irradiating field angle of the marker light irradiating section are made variable in a similarity fashion due to movement of the first or second lenses and associated movement of the marker lens.

11. The optical information readout apparatus according to claim 1, wherein:
the image forming optical section includes first and second lens assemblies carrying the first and second lenses, respectively, and operative to move the first and second lenses in the linearly different positions along the light receiving optical axis.

12. The optical information readout apparatus according to claim 11, wherein:
the first and second lens assemblies include first and second lens holder means, each made of magnetic material, for carrying the first and second lenses and permanent magnets, respectively, and first and second coil means associated with the first and second lens holder means, respectively, to move the first and second lenses in the linearly different positions.

13. The optical information readout apparatus according to claim 12, wherein:
the first and second coil means include core members cooperating with the first and second lens holder means, respectively, to apply forces thereto when commanded by the controller.

14. The optical information readout apparatus according to claim 12, wherein:
the first and second lens assemblies further include first and second illumination lenses integrally formed with the first and second lenses, respectively, and carried by the first and second lens holder means, respectively.

15. An optical information readout apparatus comprising:
a readout device including a photodetector and an image forming optical section having first and second lenses disposed in front of the photodetector to be movable in linearly different positions, respectively, along a light receiving optical axis of the photodetector;
a focus shift device including first and second drive means operative to drivingly move the first and second lenses in the linearly different positions to change a focusing zone for an information code present in a readout object; and
control means operative to control the first or second drive means so as to linearly move the first and second lenses along the light receiving optical axis to automatically change a focal position of the image forming optical section in the occurrence of a failure in reading out the information code from image data picked up by the photodetector,
wherein the focus shift device includes drive means, associated with the first and second lenses, respectively, which are operative to independently move the first and second lenses in the different positions along the light receiving optical axis,
wherein the focus shift device further includes lens holder means operative to hold the first and second lenses in the different positions, respectively, under a nonconductive state of the drive means.

* * * * *